April 5, 1960
C. J. DAVIES
2,931,674
SEPARABLE SPLICE FOR ENDLESS FLEXIBLE BANDS
Filed April 23, 1958
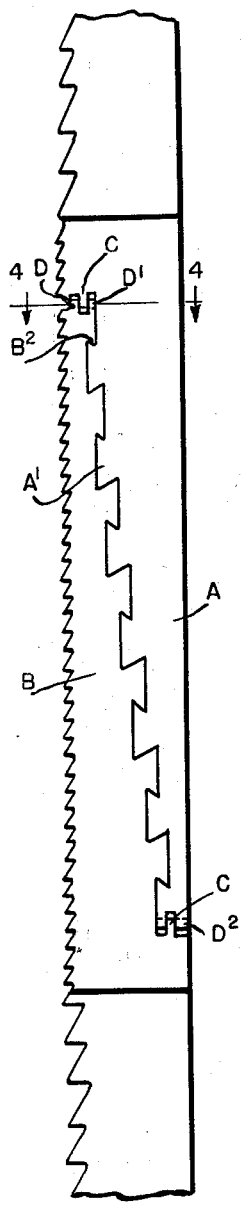
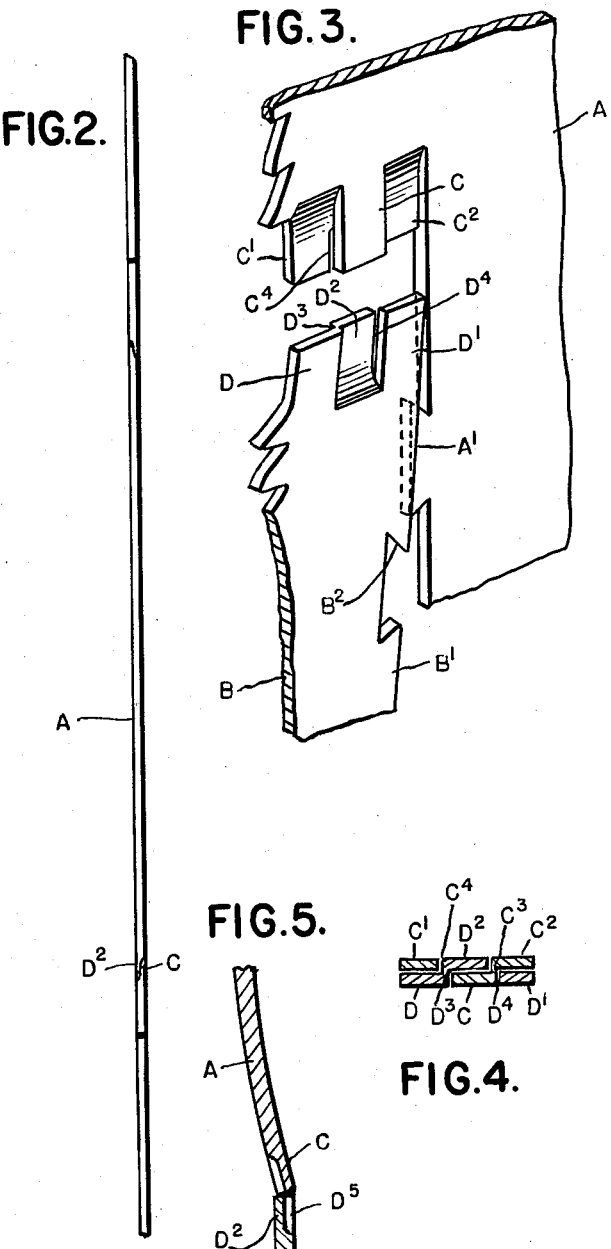
INVENTOR.
CLARENCE J. DAVIES
BY
ATTORNEYS United States Patent Office 2,931,674
Patented Apr. 5, 1960

2,931,674

SEPARABLE SPLICE FOR ENDLESS FLEXIBLE BANDS

Clarence J. Davies, Mount Clemens, Mich.

Application April 23, 1958, Serial No. 730,494

7 Claims. (Cl. 287—64)

The invention relates to apparatus including an endless flexible band which on occasions must be severed for engagement with the work or other portions of the construction and reunited for operation. An example of such construction is a band saw which frequently must be cut for threading through an aperture in the work before beginning the sawing. Usually the reuniting of the severed ends is by welding which requires the use of costly equipment. It is the object of the invention to obtain a joint or splice for the band which is separable and reunitable when ever desired and without deformation or destruction of any part thereof. It is a further object to obtain increased strength in the joint over other portions of the band.

With these objects in view the invention consists in the construction of separable and reunitable joint and method of operating the same as hereinafter set forth.

In the accompanying drawings:

Fig. 1 is an elevation showing portions of a band saw with the complementary portions of the joint welded thereto but separable from each other.

Fig. 2 is an elevation at right angles to Fig. 1.

Fig. 3 is an enlarged perspective view illustrating the locking means at one end of the joint.

Fig. 4 is an enlarged cross section on line 4—4 of Fig. 1.

Fig. 5 is an enlarged longitudinal section illustrating the manner of engaging the locking means at the opposite end of the joint from that in Fig. 3.

As fully described and claimed in a copending application for patent the separable joint or splice comprises essentially complementary stepped hook portions extending transversely across the width of the band, each having the hooks thereof engaging correspondingly shaped recesses in the other. As the shoulders of the hooks are normal to the plane of the band there will be no tendency by longitudinal stresses in the latter to separate the planes of the engaged portions. However, it is essential to guard against any such separation which is accomplished by locking members. These, as specifically shown in the said application, include a member which must be deformed to effect the locking and destroyed each time the splice is separated.

As above stated it is one of the features of the invention to obtain a construction of joint which may be engaged or disengaged without deformation or destruction of any part thereof. However the locking means must be confined within the thickness of the band and to prevent relative movement in a direction normal to the plane of the band it must also include an overlapping connection between the portions to be locked, requiring for its engagement a movement in said plane. On the other hand when the complementary hook members are in engagement with each other, they are held against any relative movement in their common plane. These two conditions seem to defeat each other, the locking requiring relative longitudinal movement and the hooked engagement preventing such movement, hence the apparent necessity for deformation to lock and destruction to unlock. I have however overcome this difficulty by a construction of locking means and method of operating the same by which the lock is effective when the band saw or other endless band is in operation but when not in operation may be unlocked and relocked without change in any part thereof.

As the construction of the splice with the exception of the locking means is the same as in my copending application, it may be briefly described as comprising two complementary members A and B, each having a series of stepped dovetail hooks A', B' engaging correspondingly shaped recesses B², A² in the other. The shoulders of the hooks are normal to the common plane of these members which permits of moving them in or out of engagement in either direction from said plane. As the members are flexible they may when relieved of tension be bowed either in the same direction or in opposite directions. When oppositely bowed the ends of the two members may be in the same plane while all of the hooks are disengaged from their recesses.

Making use of this feature a locking means is located at each of the opposite ends of the stepped hook portions of the members A and B and is of the following construction:

Each member has projecting tongues which are of only one-half the thickness of the rest of the members, the tongues of one overlapping those of the other and both lying within the total thickness of the band. Furthermore the tongues of each member are formed in a plurality of portions, preferably three, with the outer portions flush with one face of the band and the center portion flush with the opposite face. This arrangement is reversed in the two members so that the outer portions prevent movement in one direction out of their common plane and the center portion prevents movement in the opposite direction. Thus, as shown in Fig. 3, the member A has a center tongue portion C flush with the front face thereof and a pair of outer tongue portions C' and C² flush with the rear face. The member B has a pair of outer tongue portions D and D' flush with the front face and a center tongue portion D² flush with the rear face. For increased strength one of the outer tongue portions of each of the separable members is connected with the center tongue portion thereof by an integral portion C³, D³ but the other outer tongue portions are necessarily severed from their center tongue portions at C⁴, D⁴. The offsetting of the tongues has the important advantage of holding the engaged sections in transverse alignment as well as in the same planes.

The method of operation in locking and unlocking is to engage the tongues of the lock at one end (Fig. 3), while other portions of the members A and B are in separate planes with the hooks thereof disengaged. This permits the necessary longitudinal movement relative to each other. These members A and B are then bowed oppositely and differentially to bring the end of the tongue C (Fig. 5) of the member B adjacent to the end of the tongue D² of the member A. The tongue C is then moved into the recess D⁵ by releasing some of the bowing of the member B, after which the bowing of both members A and B is fully released to bring the hooks thereof in engagement with each other. The resiliency of the members will then hold them in this position, particularly where the band is under longitudinal tension, as when in operation. It will be understood that the flexibility and resilience of the band is sufficient to permit bending of the tongues, particularly the severed outer tongue portions during engagement and disengagement thereof.

The method of disengaging the joint is in the reverse order. The members A and B are first bowed to disengage the hooks thereof from each other and then the member B is further bowed to disengage the tongues from each other successively at opposite ends.

What I claim as my invention is:

1. A separable and reengageable joint for flexible bands comprising a pair of elongated members having complementary hook portions which when in engagement in a common plane restrain relative movement therein, said hook portions being engageable with each other by a relative movement transverse to said plane, and locking means on said members for restraining said relative transverse movement, said locking means being engageable and disengageable by relative movement of said members in their common plane, said hook portions and locking means being in longitudinally spaced locations, whereby flexing of said members therebetween will permit engagement of said locking means in advance of engagement of said hook portions and without interference therefrom.

2. The construction as in claim 1 having said locking means located at each of the opposite ends of said hook portions, each said locking means having overlapping tongues engageable by relative longitudinal movement of said members in opposite directions, said hook portions being separable by bowing of said members oppositely, and the last operated locking means being engageable or disengageable by differential bowing.

3. A separable and reengageable joint for endless flexible bands comprising a pair of elongated members having along their longitudinal edges complementary reverse hook portions extending in a plurality of spaced steps across the width of said members which when in engagement in a common plane restrain relative movement therein, said hook portions being engageable with each other by a relative movement normal to said plane, and locking means on said members at each of the opposite ends of said hook portions for restraining said relative normal movement, each said locking means having overlapping tongues engageable and disengageable by relative longitudinal movement of said members in their common plane, whereby bowing of said members therebetween will permit engagement of said locking means in advance of engagement of said hook portions and without interference therefrom.

4. The construction as in claim 3 in which the tongues of said locking means are only half the thickness of the rest of said members, each tongue having tongue portions flush with opposite faces and overlapping tongue portions of the other member to restrain movement in either direction transverse to the plane of the band.

5. The construction as in claim 4 in which the offsetting of said tongue portions align said members transversely of the band as well as in the plane thereof.

6. The construction as in claim 5 in which the tongues of each member are in three portions, the outer portions being flush with one face and the center portion flush with the opposite face.

7. The construction as in claim 6 in which one of the outer tongue portions of each member is integral with the central portion thereof, the other outer portion being separate from its central portion and independently flexible.

References Cited in the file of this patent

UNITED STATES PATENTS

| | | |
|---|---|---|
| 428,058 | Richards | May 13, 1890 |
| 819,866 | Dobson | May 8, 1906 |
| 837,439 | Wallace | Dec. 4, 1906 |
| 853,282 | Wallace | May 14, 1907 |
| 983,093 | Svenson | Jan. 31, 1911 |
| 1,332,626 | Henegar | Mar. 2, 1920 |
| 1,581,019 | Roe | Apr. 13, 1926 |
| 2,538,043 | Roy et al. | Jan. 16, 1951 |

FOREIGN PATENTS

| | | |
|---|---|---|
| 5,592 | Great Britain | Dec. 21, 1881 |